United States Patent
Cheng et al.

(10) Patent No.: US 10,320,279 B2
(45) Date of Patent: Jun. 11, 2019

(54) POWER SUPPLIES AND METHODS FOR REDUCING COMMON MODE NOISE

(71) Applicant: Astec International Limited, Kowloon (HK)

(72) Inventors: Wing Ling Cheng, Taipo (HK); Yuk Man Shing, Kowloon (HK)

(73) Assignee: Astec International Limited, Kwun Tong, Kowloon (HK)

( * ) Notice: Subject to any disclaimer, the term of this patent is extended or adjusted under 35 U.S.C. 154(b) by 16 days.

(21) Appl. No.: 14/957,089

(22) Filed: Dec. 2, 2015

(65) Prior Publication Data

US 2017/0163145 A1 Jun. 8, 2017

(51) Int. Cl.
*H02M 1/44* (2007.01)
*H02M 3/335* (2006.01)
*H02M 1/12* (2006.01)

(52) U.S. Cl.
CPC ........ *H02M 1/12* (2013.01); *H02M 2001/123* (2013.01)

(58) Field of Classification Search
CPC .................. H02M 1/44; H01F 27/2847; H01F 2027/2857; B23K 9/1031; G01R 31/42; G01R 35/02
See application file for complete search history.

(56) References Cited

U.S. PATENT DOCUMENTS

| 3,963,975 A * | 6/1976 | Gauper, Jr. ............. H01F 27/34 307/150 |
| 5,724,236 A | 3/1998 | Oglesbee |
| 8,154,371 B2 | 4/2012 | Espino |
| 2006/0103366 A1 | 5/2006 | Akselrod et al. |
| 2007/0171585 A1 * | 7/2007 | Sicong .................. H01F 27/362 361/38 |

* cited by examiner

*Primary Examiner* — Nguyen Tran
*Assistant Examiner* — Monica Mata
(74) *Attorney, Agent, or Firm* — Harness, Dickey & Pierce, P.L.C.

(57) ABSTRACT

An example switched-mode power supply includes an input for receiving an input voltage from a voltage source, an output for providing an output voltage to a load, and a transformer having a primary winding, a secondary winding, and a conductive shield disposed between the primary winding and the secondary winding. The power supply also includes a neutralization signal generator circuit coupled to the conductive shield to apply a neutralization signal to the conductive shield to reduce a common mode noise between the primary winding and the secondary winding of the transformer. The neutralization signal has an adjustable amplitude and/or phase. Other example power supplies and methods are also disclosed.

17 Claims, 9 Drawing Sheets

POWER SUPPLIES AND METHODS FOR REDUCING COMMON MODE NOISE

FIELD

The present disclosure relates to power supplies and methods for reducing common mode noise.

BACKGROUND

This section provides background information related to the present disclosure which is not necessarily prior art.

Switched-mode power supplies typically operate at high switching frequencies ranging from a few KHz to MHz range. There are typically periodic voltage changes on the terminals of a switched-mode power supply transformer and corresponding voltage swings on every winding layer of the transformer. Common mode noise coupling typically occurs as a result of voltage differences between one winding layer and its neighboring layers. The voltage differences drive AC current through the inter-winding capacitance of winding layers, causing coupled noise current. The net common mode noise current coupled between windings, and most importantly between primary and secondary windings, is typically non-zero for most power supply designs.

Common mode noise is typically electrical noise measured between a power supply and an earth ground reference point. Common mode noise may occur for a number of reasons, including the number of turns of neighboring windings being different, a phase relationship between neighboring windings being out of phase, a non-zero inter-winding capacitance between layers, mechanical alignment of layers, insulation thickness variation between layers, phase relationships of different topologies, etc.

Several techniques may be used to counter common mode noise, including electromagnetic interference (EMI) filters, differential and common mode inductors, block and bypass EMI components, etc. Circuit to earth capacitors (e.g., Y-capacitors) can provide local bypass of interference current and reduce externally measureable interference components. Transformer winding shields may be used to block and bypass inter-winding coupling components completely, partially, etc. EMI noise cancellation may also be used.

Common mode noise may be coupled through a transformer to a user device. The common mode noise may interfere with touch pad capacitive sensing, result in sluggish response in screen movement, etc. Smaller size and costs of some charger applications for smart phones, tablet computers, etc. may not allow for the use of conventional common mode filters for interference attenuation.

SUMMARY

This section provides a general summary of the disclosure, and is not a comprehensive disclosure of its full scope or all of its features.

According to one aspect of the present disclosure, a switched-mode power supply generally includes an input for receiving an input voltage from a voltage source, an output for providing an output voltage to a load, and a transformer having a primary winding, a secondary winding, and a conductive shield disposed between the primary winding and the secondary winding. The power supply also includes a neutralization signal generator circuit coupled to the conductive shield to apply a neutralization signal to the conductive shield to reduce a common mode noise between the primary winding and the secondary winding of the transformer. The neutralization signal has an adjustable amplitude and/or phase.

According to another aspect of the present disclosure, a method of reducing common mode noise in a switched-mode power supply is disclosed. The power supply includes an input for receiving an input voltage from a voltage source, an output for providing an output voltage to a load, and a transformer having a primary winding, a secondary winding, and a conductive shield disposed between the primary winding and the secondary winding. The method includes measuring a common mode noise between the primary winding and the secondary winding of the transformer, and applying a neutralization signal to the conductive shield to reduce the common mode noise between the primary winding and the secondary winding of the transformer, wherein the neutralization signal has an adjustable amplitude and/or phase.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
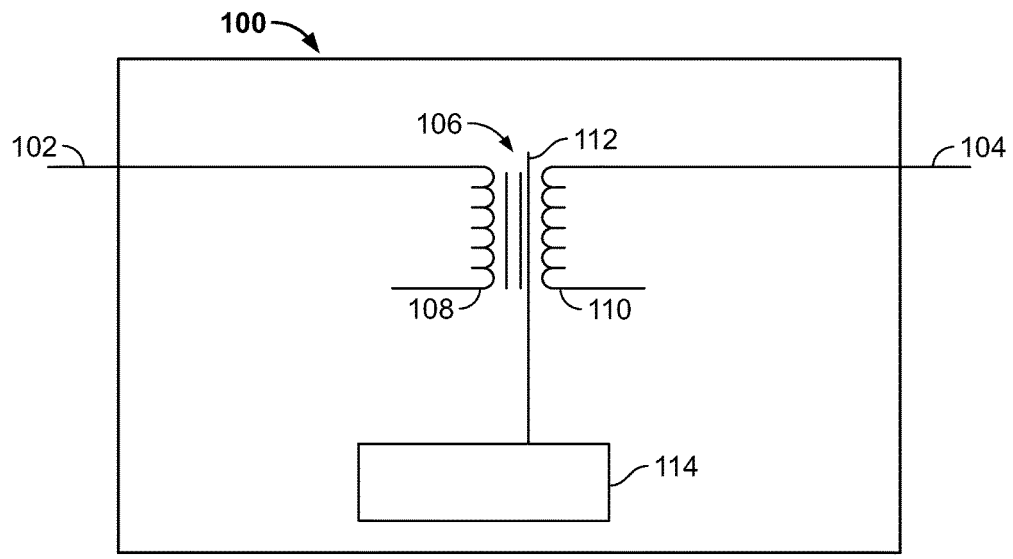
FIG. 1 is a block diagram of an example switched-mode power supply for reducing common mode noise.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A power supply according to one example embodiment of the present disclosure is illustrated in FIG. 1 and indicated generally by reference number 100. As shown in FIG. 1, the power supply 100 includes an input 102 for receiving an input voltage from a power source and an output 104 for providing an output voltage to a load. The power supply 100 also includes a transformer 106 having a primary winding 108 and a secondary winding 110, and a conductive shield 112 disposed between the primary winding and the secondary winding. The power supply further includes neutralization signal generator circuit 114 coupled to the conductive shield 112 to apply a neutralization signal to the conductive shield to reduce a common mode noise between the primary winding 108 and the secondary winding 110 of the transformer 106. The neutralization signal has an adjustable amplitude and/or phase.

As a result, the neutralization signal can be tailored if desired to the unique design and/or manufacturing attributes of the switched-mode power supply, transformer, etc.

The switched-mode power supply 100 may operate at any suitable switching frequency (e.g., KHz, MHz, etc.). The power supply 100 may be used in any suitable application, including a charger (e.g., high density charger) for a smartphone, tablet computer, etc., imaging power supplies, medical power supplies, instrumentation and avionic power supplies, any other equipment sensitive to common mode noise, etc.

The input 102 may be any suitable input for receiving a voltage from a source, including one or more input terminals (e.g., electrical connectors, etc.) coupled to an AC power source, etc. The output 104 may be any suitable output for providing a voltage to a load, including one or more output terminals (e.g., electrical connectors, etc.) coupled to load equipment, etc.

The power supply 100 may be an AC-DC converter that receives an input AC voltage and provides an output DC voltage. The power supply 100 may include one or more rectifier circuits, filter circuits, etc. The power supply 100 may include one or more control circuits (e.g., a controller, microprocessor, integrated circuit, etc.) to control operation of the power supply. The power supply 100 may include one or more switches (e.g., MOSFETs, BJTs, etc.) which may be operated to control the output voltage at the output 104.

The transformer 106 may be any suitable transformer having any suitable construction, including any suitable core design, material(s), etc. The transformer 106 includes a primary winding 108 and a secondary winding 110. The primary winding 108 may include any suitable number of windings (e.g., coils), and may be separated into one or more portions, layers, etc. The primary winding 108 may be coupled to the voltage source via the input 102. The secondary winding 110 may also include any suitable number of windings (e.g., coils) and may be separated into one or more portions, layers, etc. The secondary winding may be coupled to one or more rectifier circuits, filter circuits, etc. to generate a desired output voltage at the output 104. The transformer 106 may include one or more auxiliary windings. The auxiliary windings may provide power to sustain continuous operation of one or more primary side circuits, and may be positioned on a same side of the transformer as the primary winding 108.

The conductive shield 112 may be any suitable conductive shield capable of reducing a common mode noise between windings of the transformer 106. The conductive shield 112 may be positioned at any suitable location in the transformer 106. For example, the conductive shield 112 may be positioned between the primary winding 108 and the secondary winding 110, between one or more layers of the primary and secondary winding, between an auxiliary winding and the secondary winding, etc. The conductive shield 112 may be made out of any suitable material(s) capable of reducing an electromagnetic interference, including conductive material (s) (e.g., a conductive foil), etc.

The neutralization signal generator circuit 114 may include any suitable component(s) capable of applying a neutralization signal to the conductive shield 112. For example, the neutralization signal generator circuit 114 may include an additional transformer, a potentiometer, an additional winding of the transformer 106, a programmable gain amplifier, one or more resistors with specified resistance values, etc. Some example neutralization signal generator circuits 114 will be described in further detail below.

The neutralization signal generator circuit 114 may be adapted to adjust the neutralization signal to better reduce the common mode noise between the primary winding 108 and secondary winding 110. For example, a component(s) of the neutralization signal generator circuit 114 may be adjusted to change the amplitude and/or phase of the neutralization signal to tailor the neutralization signal to the unique attributes of the switched-mode power supply 100 to better reduce the common mode noise of the transformer 106. The neutralization signal may be adjusted to have substantially the same amplitude and opposite phase of a common mode noise signal of the transformer 106.

Figure 2:
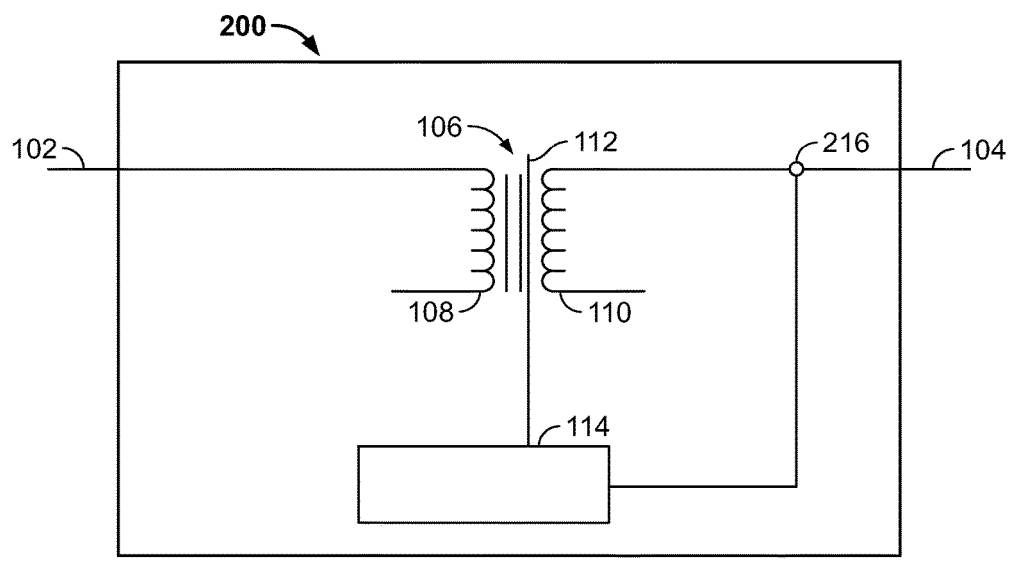
FIG. 2 is a block diagram of the power supply of FIG. 1, including an interference measurement component.

FIG. 2 illustrates another example power supply 200, which is similar to the power supply 100 of FIG. 1, but includes an interference measurement component 216. The interference measurement component 216 measures the common mode noise between the primary winding 108 and the secondary winding 110 of the transformer 106. The interference measurement component may be any suitable component(s) capable of measuring the interference. For example, the interference measurement component 216 may include a sense resistor, which may be coupled to the output 104. Some example interference measurement components 216 measure primary-secondary impedance to determine the common mode noise of the transformer 106.

As shown in FIG. 2, the interference measurement component 216 may be coupled to the neutralization signal generator circuit 114. The measured common mode noise may be provided to the neutralization signal generator circuit 114 to allow the generator to determine how to adjust the neutralization signal to improve cancellation of the common mode noise. The measured common mode noise may be used as a feedback signal to adjust the neutralization signal to improve cancellation of the common mode noise.

Figure 3:
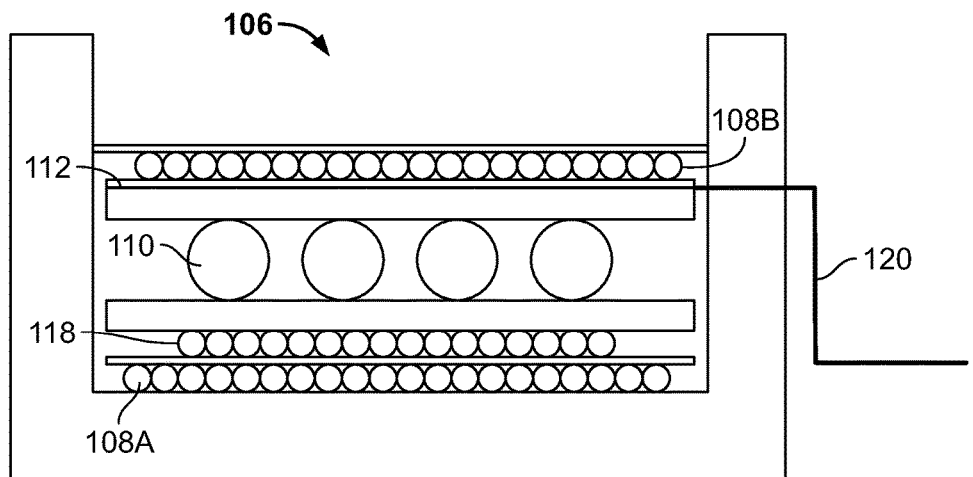
FIG. 3 is a sectional view of a portion of the transformer of FIG. 1.

FIG. 3 illustrates a portion of transformer 106. In this example, the primary winding 108 is separated into an inner primary winding layer 108A and an outer primary winding layer 108B. The transformer 106 also includes an auxiliary winding 118. The secondary winding 110 is positioned between the auxiliary winding 118 and the outer primary winding layer 108B. Splitting the primary winding 108 and surrounding the secondary winding 110 may provide improved electrical characteristics (e.g., lower leakage inductance, etc.). The winding layers may have one or more insulating layers positioned between them, to prevent different winding layers from shorting one another via contact. In other embodiments, the winding layers may be arranged differently, there may be more or less layers, etc.

The conductive shield 112 is positioned between the secondary winding 110 and the outer primary winding layer 108B. In one example, a location for the conductive shield 112 may be determined by first identifying the secondary winding 110 and then identifying the first primary winding/secondary winding interface, starting from the inner core of the transformer 106. For example, starting from the inner core (i.e., center axis of the transformer 106) in FIG. 3, the first primary/secondary interface occurs between the secondary winding 110 and the auxiliary winding 118, because the auxiliary winding is part of the primary winding. The conductive shield 112 may then be placed on the opposite side of the first primary/secondary interface (e.g., the 'next' primary/secondary interface moving outwards from the center axis). Accordingly, the conductive shield 112 is placed on the outer side of the secondary winding 110, between the secondary winding and the outer primary winding layer 108B. In other embodiments, the conductive shield may be placed in other suitable locations.

The transformer 106 may also include a conductive shield connector 120. The conductive shield connector 120 may be any suitable connector for coupling the conductive shield 112 to the neutralization signal generator circuit 114, such that the neutralization signal may be applied from the generator to the conductive shield. For example, the connector 120 may be a wire, other conductive element, etc. Accordingly, the neutralization signal generator circuit 114 may apply the neutralization signal to the conductive shield 112 via the connector 120 to substantially cancel the common mode noise between the primary winding and the secondary winding of the transformer.

Figure 4:
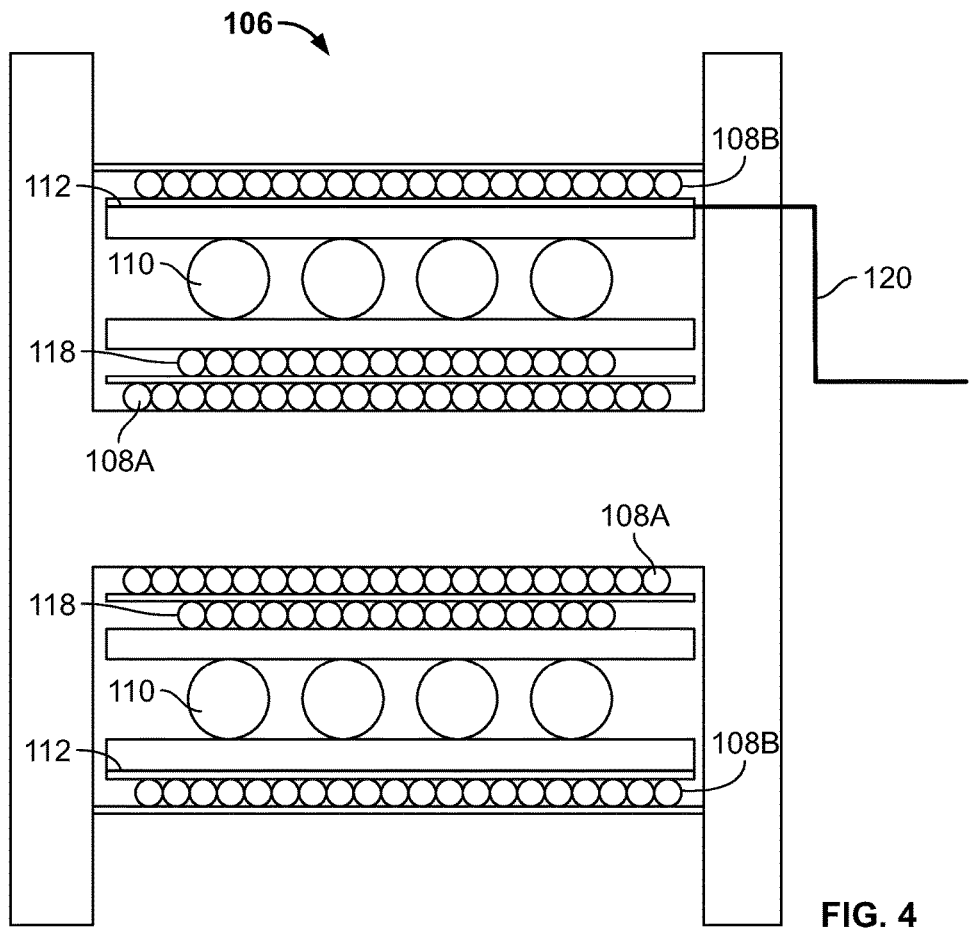
FIG. 4 is another sectional view of the transformer of FIG. 1.

FIG. 4 both halves of the transformer 106. The winding layers, conductive shield, etc. may be wound about a center of the transformer. Accordingly, the winding layers, conductive shield, etc. may be symmetrical about the center of the transformer.

As shown in FIG. 4, the primary winding 108 is separated into an inner primary winding layer 108A and an outer primary winding layer 108B. Although FIG. 4 illustrates a primary winding 108 as separated into inner and outer layers, other embodiments may include a single primary winding layer, more than two primary winding layers, primary winding layers positioned in different locations, etc.

The transformer 106 also includes a secondary winding 110 and an auxiliary winding 118. The secondary winding 110 is positioned between the auxiliary winding 118 and the outpour primary winding layer 108B. Other embodiments may include a secondary winding separated into multiple layers, a secondary winding positioned in other locations etc. More or less (or none) auxiliary windings may be included, the auxiliary winding(s) may be positioned in different locations, etc.

The transformer 106 also includes a conductive shield 112. The conductive shield 112 is positioned between the secondary winding 110 and the outer primary winding layer 108B. The conductive shield 112 may extend about substantially a whole circumference of the windings of the transformer 106. In other embodiments the conductive shield may be positioned in other locations (e.g., between other sets of windings, etc.), may extend about only a portion of the circumference of the windings, etc.

The transformer 106 of FIG. 4 is illustrated as having an H-shape. Alternatively, the transformer 106 may have any other suitable shape.

Figure 5:
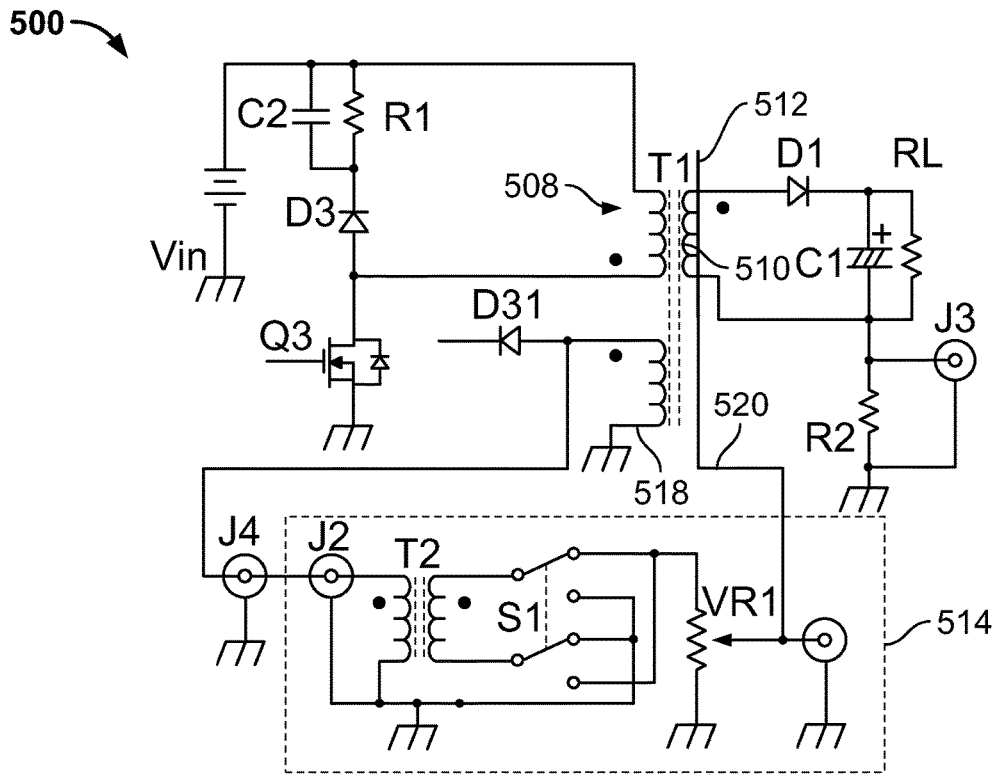
FIG. 5 is a circuit diagram of another example power supply having a neutralization signal generator circuit that includes a second transformer.

FIG. 5 illustrates another example power supply 500. The power supply 500 includes an input for receiving an input voltage from source Vin, and an output for providing an output voltage to load RL. The power supply 500 also includes a transformer T1 having a primary winding 508, a secondary winding 510 and an auxiliary winding 518.

The neutralization signal generator circuit 514 includes a secondary transformer T2, a switch S1, and a potentiometer VR1. The potentiometer VR1 may be used to adjust an amplitude of the neutralization signal. The amplitude may be adjusted to cancel the common mode noise of generator T1.

Transformer T2 is separate from transformer T1. The transformer T2 may be used to change the phase, maximum adjustable amplitude, etc. of the neutralization signal. For example, the number of windings of transformer T2, etc. may be selected to provide the proper phase, maximum adjustable amplitude, etc. of the neutralization signal. Accordingly, transformer T2 and potentiometer VR1 may allow for adjustment of the neutralization signal provided to the conductive shield 512 via the conductive shield connector 520.

Power supply 500 also includes an interference measurement component R2. The interference measurement component R2 is illustrated as a sense resistor, and may have any suitable resistance (e.g., 10 k ohms, etc.). The sense resistor is coupled to the secondary winding 510 to sense a common mode noise of the transformer T2. The sensed common mode noise may be used to adjust the neutralization signal generator circuit 514. For example, transformer T2 and potentiometer VR1 may be adjusted to produce a neutralization signal having a substantially similar amplitude and opposite phase as the measured common mode noise signal. The common mode noise may be measured at a same location that the conductive shield will inject the neutralization signal to reduce the common mode noise. Other embodiments may include other suitable types of interference measurement components.

Figure 6:
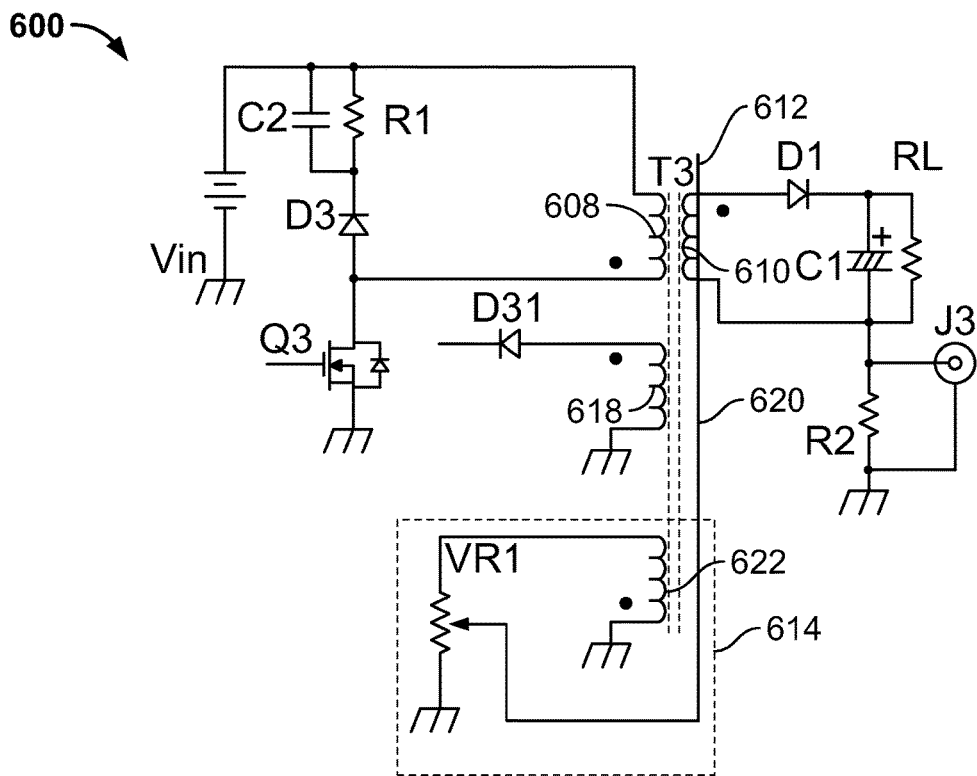
FIG. 6 is a circuit diagram of another example switched-mode power supply for reducing common mode noise having a neutralization signal generator circuit that includes at least one winding of the transformer.

FIG. 6 illustrates another example power supply 600. The power supply 600 is similar to the power supply 500 of FIG. 5, but transformer T2 is incorporated as a winding of the transformer T1. Accordingly, power supply 600 includes a single transformer T3 that includes a primary winding 608, secondary winding 610, auxiliary winding 618, and a winding 622 belonging to the neutralization signal generator circuit 614.

Neutralization signal generator circuit 614 includes a winding 622 of transformer T3, and a potentiometer VR1. The phasing of winding 622 can be selected to provide appropriate phase, maximum amplitude, etc. of the neutralization signal provided to the conductive shield 612 via the conductive shield connector 620. For example, the winding 622 may have a defined number of turns, a specific position in the transformer T3, etc. to provide a desired phase, maximum amplitude, etc. Potentiometer VR1 may be adjusted to provide a desired amplitude of the adjustable neutralization signal.

Figure 7:
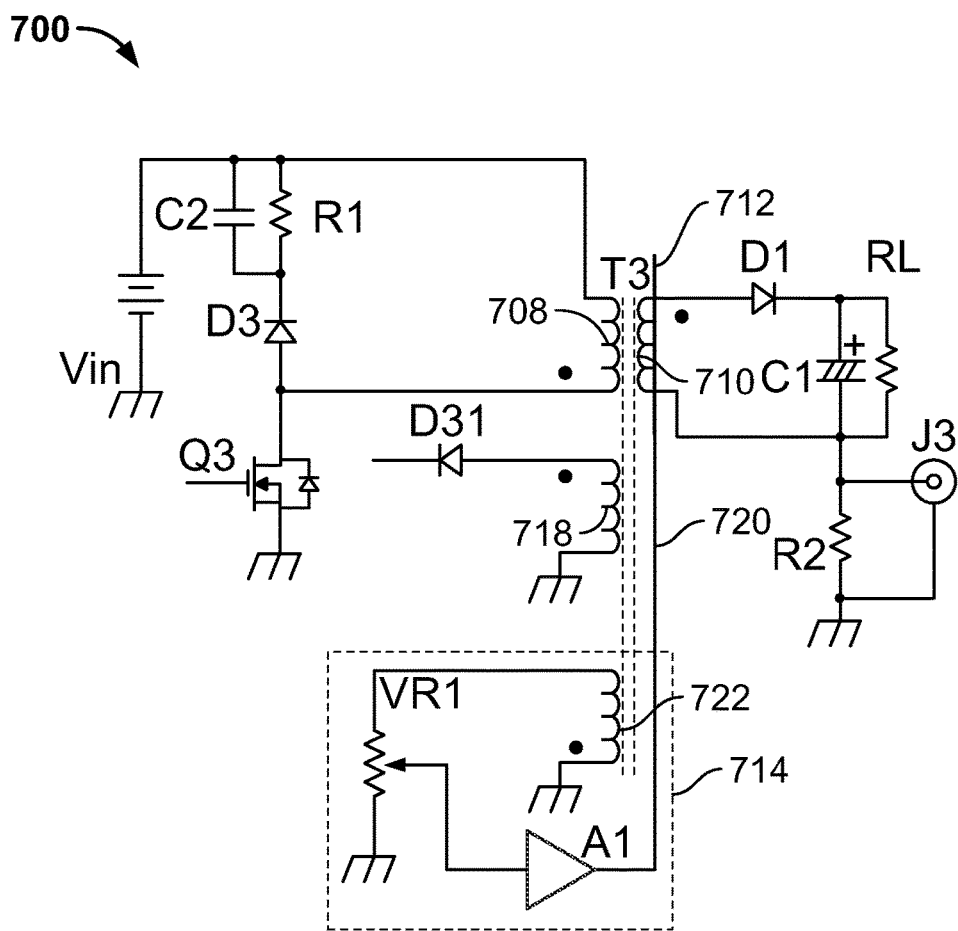
FIG. 7 is a circuit diagram of another example switched-mode power supply for reducing common mode noise including an adjustable gain amplifier having neutralization signal generator circuit that includes an adjustable gain amplifier.

FIG. 7 illustrates another example power supply 700. The power supply 700 is similar to the power supply 600 of FIG. 6, but further includes a programmable gain amplifier A1. The programmable gain amplifier A1 is part of the neutralization signal generator circuit 714. The programmable gain amplifier A1 may be coupled to a controller (not shown).

The programmable gain amplifier A1 may automatically adjust the neutralization signal during operation of the power supply 700 based on the common mode noise measured by the interference measurement component R2. For example, the sense resistor R2 may measure the common mode noise of transformer T3 during operation of power supply 700. The measured common mode noise may be provided as feedback to the programmable gain amplifier A1. The programmable gain amplifier A1 may adjust the phase, amplitude, etc. of the neutralization signal based on the feedback to cancel the measured common mode noise. Accordingly, if the measured common mode noise signal changes, the programmable gain amplifier may adjust the neutralization signal to compensate, in order to account for changes in the common mode noise during operation.

As described above, the neutralization signal can be manually adjusted in some embodiments. For example, an operator may manually adjust the neutralization signal generator circuit to compensate for measured common mode noise. Common mode noise may be measured during production (e.g., manufacture) of the power supply, and the neutralization signal generator circuit may be adjusted to provide the proper neutralization signal tailored to the specific attributes of the individual power supply.

The neutralization signal may be adjusted by selecting a fixed resistance value (e.g., single resistor, combination of resistors, etc.) to provide the desired neutralization signal. Similarly, one or more passive circuit components may be selected with specified values to provide the desired neutralization signal. The specified resistance values, passive component values, etc. may be selected to optimize the neutralization signal applied to the conductive shield.

Automatic trimming equipment may be used to automatically adjust the neutralization signal generator to provide the proper neutralization signal. For example, automatic trimming equipment may measure common mode noise of a power supply during production, and the trimming equipment may then adjust the neutralization signal generator circuit to provide the proper neutralization signal for the individual power supply based on the measured common mode noise.

In some embodiments, the neutralization signal may be adjusted in real time during operation of the power supply. For example, a controller may be programmed to receive feedback of measured common mode noise during operation, and then adjust the neutralization signal (e.g., via a programmable gain amplifier, etc.) to cancel the measured common mode noise. As another example, an intelligent scheme in a microcontroller (MCU) may automatically adjust the neutralization signal based on feedback. This automatic adjustment may optimize the neutralization signal applied to the conductive shield.

Figure 8:
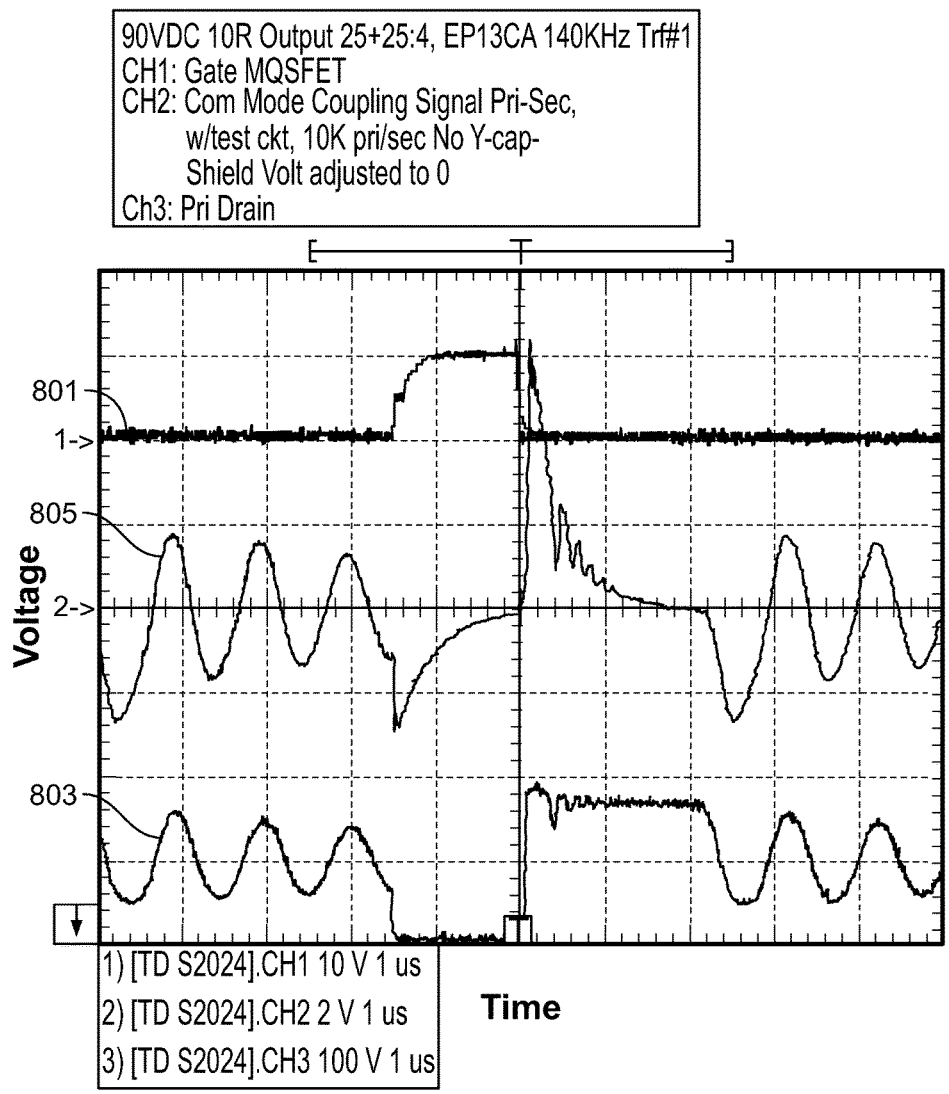
FIG. 8 is an example waveform diagram illustrating the common mode noise of a transformer.

FIG. 8 illustrates example signals observed by grounding the conductive shield (e.g., 0V neutralization signal). Trace 801 illustrates the voltage at the gate of a MOSFET during turn on and turn off of a switch. Trace 803 is a drain voltage of the primary winding. Trace 805 is the common mode coupling between the primary winding and the secondary winding of a transformer. As shown in trace 805, voltage spikes occur at turn on and turn off of the switch, but the common mode coupling voltage does not immediately reduce to approximately zero after the turn on and turn off events. Instead, the common mode noise voltage gradually reduces with a slope.

Figure 9:
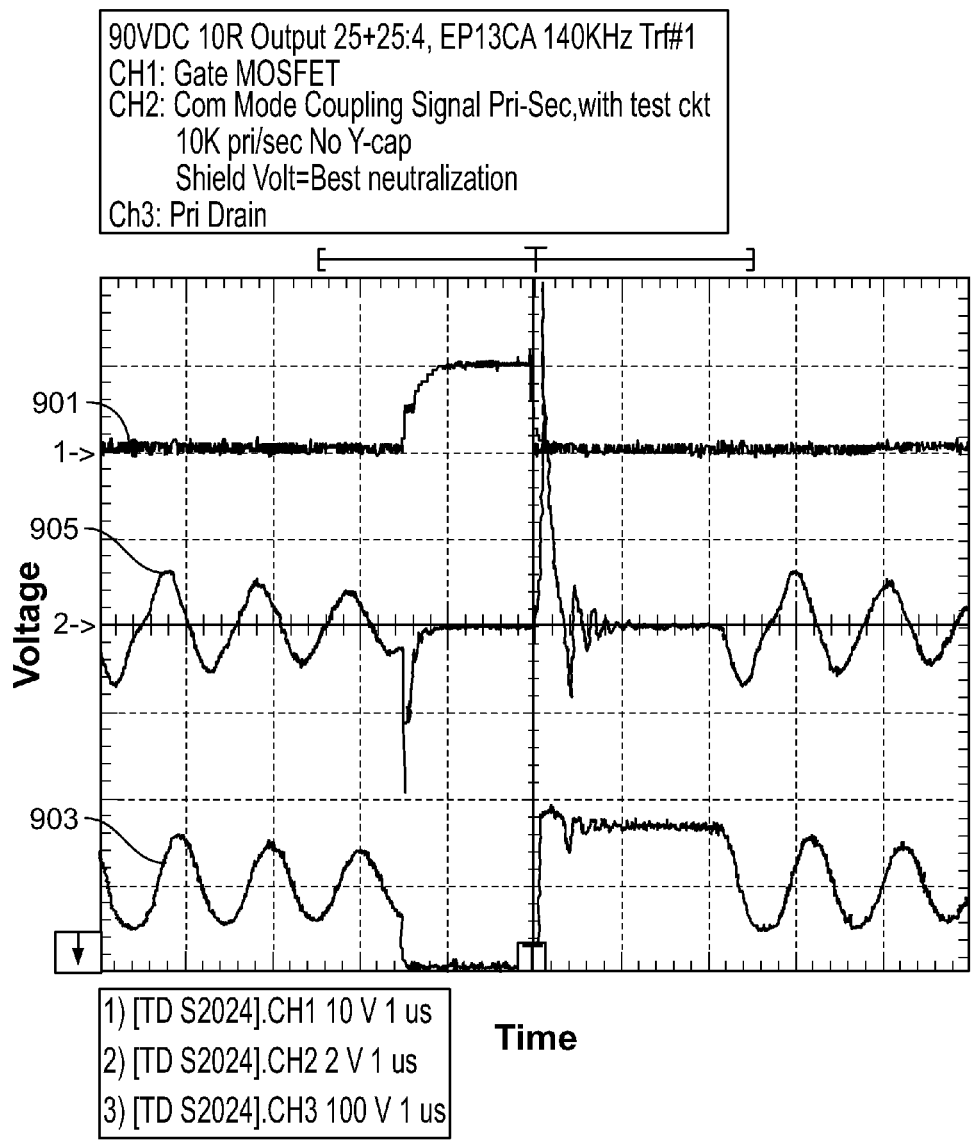
FIG. 9 is an example waveform diagram illustrating adjustment of a neutralization signal.

FIG. 9 illustrates the same traces as FIG. 8, but includes an adjusted neutralization signal. As shown in FIG. 9, trace 905 illustrates reduced common mode coupling during switch turn on and turn off events. Although the spikes still occur at switch turn on and turn off, the measured common mode coupling voltage quickly reduces to approximately zero, indicating the common mode noise has been substantially reduced (e.g., cancelled) by the neutralization signal. The neutralization signal generator is adjusted until the neutralization signal causes the common mode coupling to be approximately zero after switch turn on and turn off events.

Figure 10:
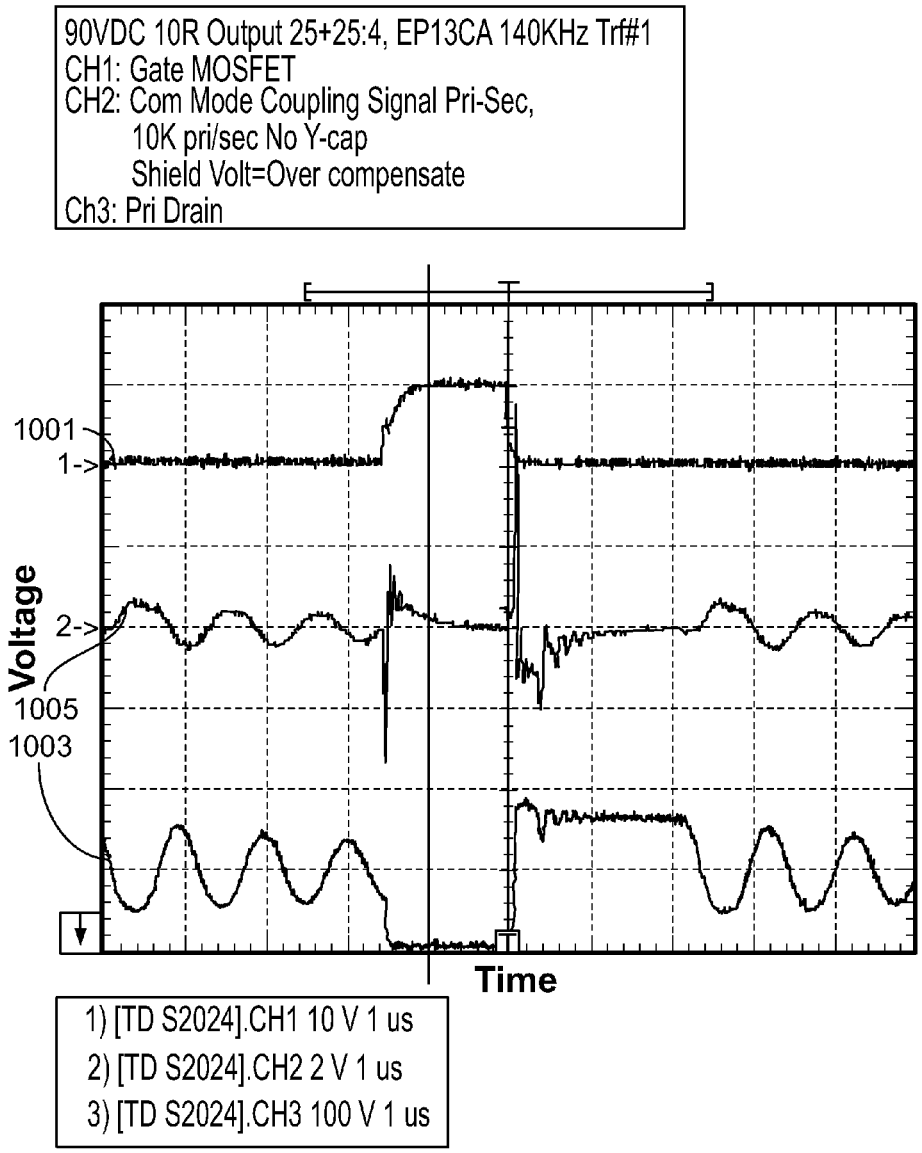
FIG. 10 is an example waveform diagram illustrating overcompensation of the neutralization signal.

FIG. 10 is similar to FIGS. 8 and 9, but illustrates an example of overcompensation of the neutralization signal. As shown in trace 1005, the neutralization signal has been adjusted to the point of overcompensation, such that the common mode coupling does not reduce to near zero after switch turn on and turn off events.

Figure 11:
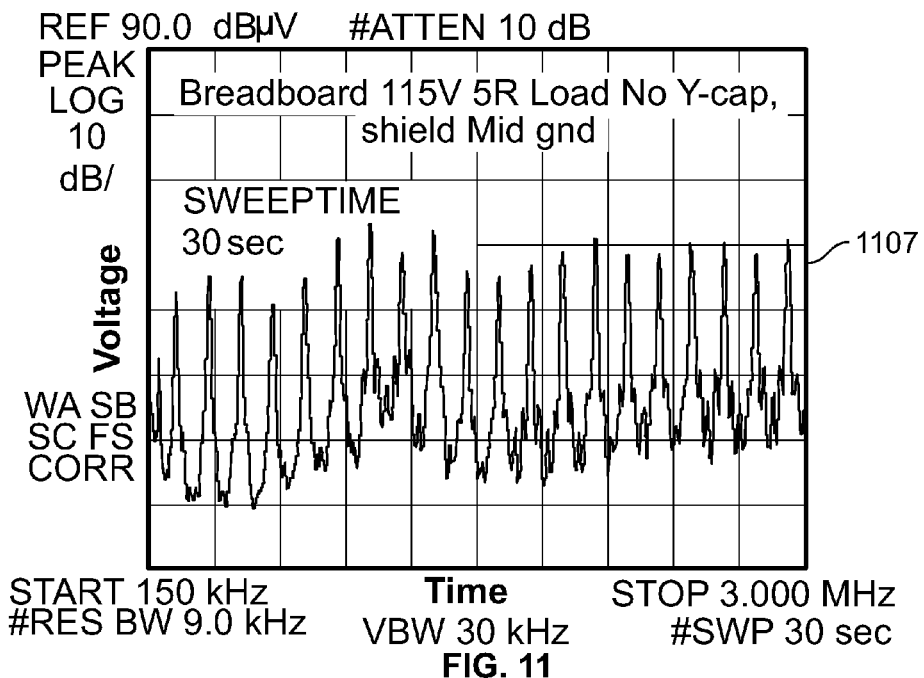
FIG. 11 is an example waveform diagram illustrating the common mode noise of a transformer with no compensation.

FIG. 11 illustrates an example waveform 1107 of an electromagnetic interference (EMI) signature of a transformer without any neutralization signal.

Figure 12:
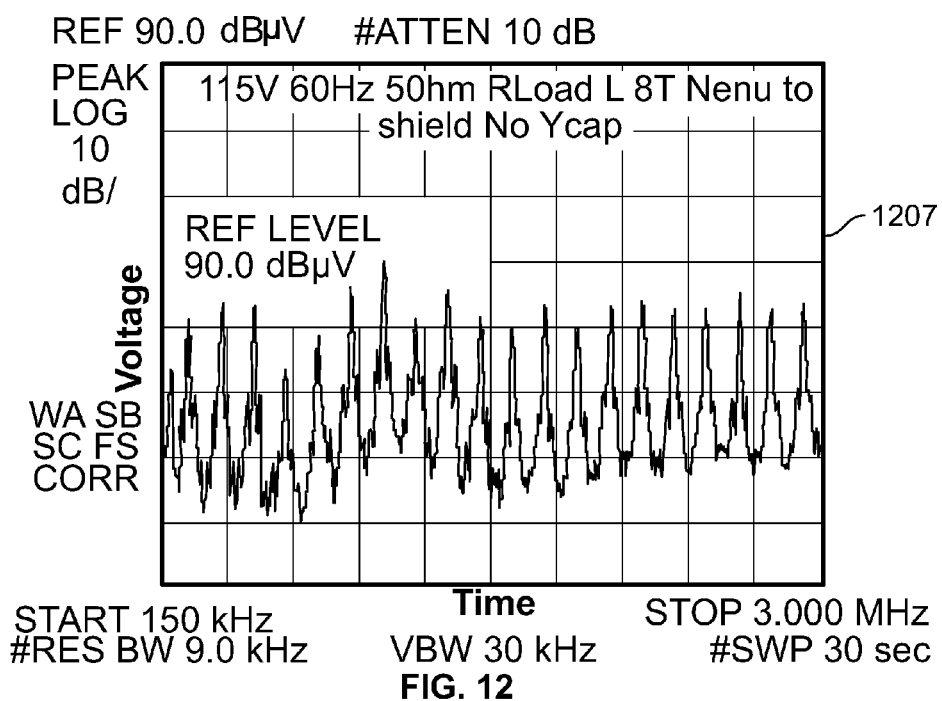
FIG. 12 is an example waveform diagram illustrating the common mode noise of a transformer with optimum compensation.

FIG. 12 illustrates an example waveform 1207 of the EMI signature with optimum compensation provided by a neutralization signal. As compared to FIG. 11, the compensated waveform 1207 of FIG. 12 illustrates improved common mode noise reduction, as the EMI signature has a smaller amplitude.

Figure 13:
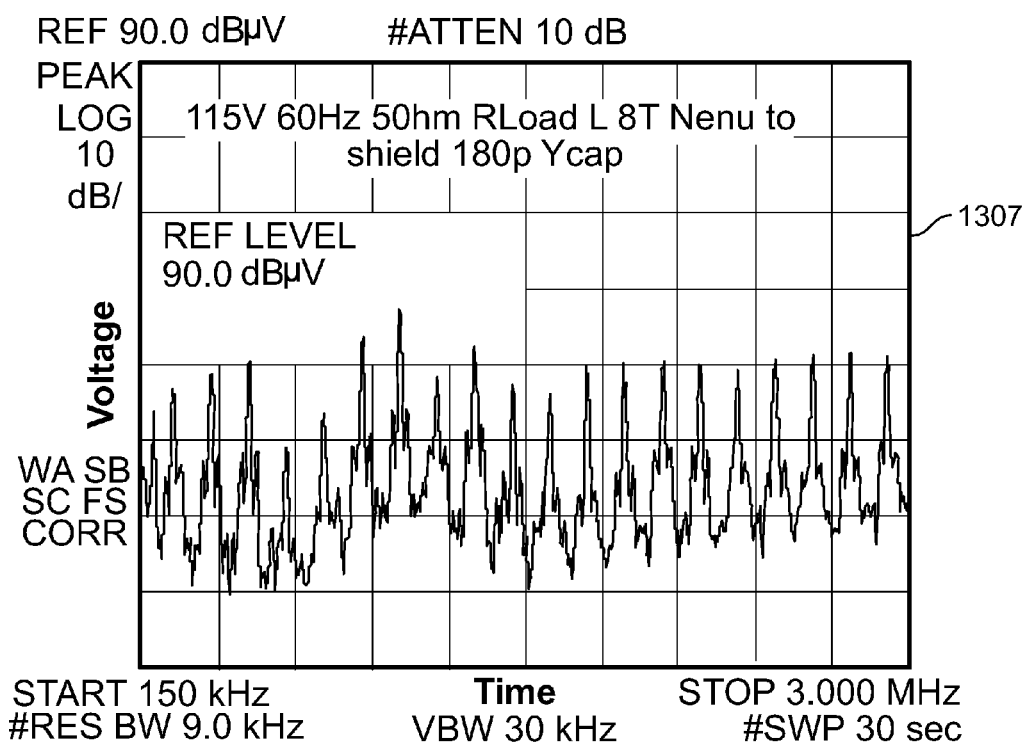
FIG. 13 is an example waveform diagram illustrating the common mode noise of a transformer when the power supply includes a Y-capacitor.

FIG. 13 illustrates an example waveform 1307 of the EMI signature with optimum compensation provided by a neutralization signal, and a Y-capacitor coupled in the power supply. The Y-capacitor could have any suitable capacitance (e.g., 180 pF, etc.). As compared to FIG. 12, the waveform 1307 that includes the Y-capacitor illustrates improved common mode noise reduction, as the EMI signature has a smaller amplitude.

An example method of reducing common mode noise in a power supply includes measuring a common mode noise between the primary winding and the secondary winding of the transformer, and applying a neutralization signal to the conductive shield to reduce the common mode noise between the primary winding and the secondary winding of the transformer. The neutralization signal has an adjustable amplitude and/or phase.

Applying the neutralization signal may include adjusting the neutralization signal to substantially cancel the common mode noise between the primary winding and the secondary winding of the transformer. The applied neutralization signal may have substantially the same amplitude and opposite phase of the measured common mode noise between the primary winding and the secondary winding of the transformer.

Adjusting the neutralization signal may include adjusting the amplitude and/or phase of the neutralization signal based on the measured common mode noise between the primary winding and the secondary winding of the transformer. Measuring the common mode noise may include measuring a common mode noise via a sense resistor.

Applying the neutralization signal may include adjusting a potentiometer to adjust the neutralization signal, adjusting an adjustable gain amplifier, adjusting the neutralization signal during operation of the power supply in response to a change in the measured common mode noise, adjusting the neutralization signal via a controller and a programmable gain amplifier, selecting one or more specified resistor values, etc.

Example embodiments described herein may provide one or more (or none) of the following advantages. An adjustable neutralization signal may allow improved cancellation for each power supply unit. The neutralization signal may be provided with continuous adjustment means, discrete adjustment means having a fine enough step, etc. The adjustable neutralization signal may compensate for variations in transformer winding, insulation, etc. The adjustable neutralization signal may compensate for non-transformer originated external coupling in an assembled unit. The injection point of the neutralization signal may be a floating shield inside of a transformer, which may be well protected from external transients, surges, etc. and may be robust against immunity tests, power line conditions, etc. Well defined criteria may be used for automatic adjustment. The neutralization signal may be derived from the same transformer that generates the common mode noise, reducing the need for complicated signal generation. Adaptive real time automatic adjustment is possible for power supplies equipped with intelligent control and a programmable gain amplifier. The adjustable neutralization signal generation can be designed for low power consumption.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switched-mode power supply comprising:
an input for receiving an input voltage from a voltage source;
an output for providing an output voltage to a load;
a transformer having a primary winding, a secondary winding, and a conductive shield disposed between the primary winding and the secondary winding; and
a neutralization signal generator circuit coupled to the conductive shield and adapted to apply a neutralization signal to the conductive shield, the conductive shield adapted to conduct the received neutralization signal to reduce a common mode noise between the primary winding and the secondary winding of the transformer, wherein the neutralization signal has an adjustable amplitude and/or phase, and the neutralization signal generator circuit is configured to automatically adjust the neutralization signal in response to measured common mode noise between the primary winding and the secondary winding of the transformer by adjusting at least one of a potentiometer, an adjustable gain amplifier and a second transformer.

2. The power supply of claim 1, wherein the transformer includes an auxiliary winding disposed on a primary side of the transformer.

3. The power supply of claim 1, wherein the neutralization signal generator circuit is adapted to apply the neutralization signal to the conductive shield to substantially cancel the common mode noise between the primary winding and the secondary winding of the transformer.

4. The power supply of claim 1, wherein the neutralization signal generator circuit includes the potentiometer.

5. The power supply of claim 1, wherein the transformer is a first transformer and the neutralization signal generator circuit includes the second transformer, the second transformer adapted to adjust the amplitude and/or phase of the neutralization signal.

6. The power supply of claim 1, wherein the neutralization signal generator circuit includes at least one winding of the transformer.

7. The power supply of claim 1, wherein the neutralization signal generator circuit includes the adjustable gain amplifier.

8. The power supply of claim 1, further comprising an interference measurement component positioned to measure the common mode noise between the primary winding and the secondary winding of the transformer.

9. The power supply of claim 8, wherein the interference measurement component includes a sense resistor.

10. The power supply of claim 8, wherein the neutralization signal generator circuit includes a controller and the adjustable gain amplifier to automatically adjust the neutralization signal during operation of the power supply based on the common mode noise measured by the interference measurement component.

11. A method of reducing common mode noise in a switched-mode power supply, the power supply including an input for receiving an input voltage from a voltage source, an output for providing an output voltage to a load, and a transformer having a primary winding, a secondary winding, and a conductive shield disposed between the primary winding and the secondary winding, the method comprising:
   measuring a common mode noise between the primary winding and the secondary winding of the transformer;
   automatically generating an adjustable neutralization signal in response to the measured common mode noise between the primary winding and the secondary winding of the transformer by adjusting at least one of a potentiometer, an adjustable gain amplifier and a second transformer; and
   applying the adjustable neutralization signal to the conductive shield to reduce the common mode noise between the primary winding and the secondary winding of the transformer, wherein the neutralization signal has substantially the same amplitude and opposite phase of the measured common mode noise.

12. The method of claim 11, wherein generating the neutralization signal includes adjusting the neutralization signal to substantially cancel the common mode noise between the primary winding and the secondary winding of the transformer.

13. The method of claim 11, wherein generating the neutralization signal includes adjusting the potentiometer.

14. The method of claim 11, wherein generating the neutralization signal includes adjusting the adjustable gain amplifier.

15. The method of claim 11, wherein generating the neutralization signal includes adjusting the neutralization signal during operation of the power supply in response to a change in the measured common mode noise.

16. The method of claim 15, wherein the power supply includes a controller and the adjustable gain amplifier, and generating the neutralization signal includes adjusting the neutralization signal via the controller and the adjustable gain amplifier.

17. The method of claim 11, wherein measuring a common mode noise includes measuring the common mode noise via a sense resistor.

* * * * *